(12) United States Patent
Chen et al.

(10) Patent No.: US 10,256,701 B2
(45) Date of Patent: Apr. 9, 2019

(54) ELECTRIC POWER TOOL AND METHOD FOR DRIVING BRUSHLESS MOTOR THEREOF

(71) Applicants: Nanjing Chervon Industry Co., Ltd., Nanjing (CN); Chervon (HK) Limited, Wanchai (HK)

(72) Inventors: Shibo Chen, Nanjing (CN); Hongwei Wang, Nanjing (CN)

(73) Assignee: Nanjing Chervon Industry Co., Ltd. (CN)

(*) Notice: Subject to any disclaimer, the term of this patent is extended or adjusted under 35 U.S.C. 154(b) by 0 days.

(21) Appl. No.: 15/905,028

(22) Filed: Feb. 26, 2018

(65) Prior Publication Data
US 2018/0183302 A1   Jun. 28, 2018

Related U.S. Application Data

(63) Continuation of application No. PCT/CN2016/095631, filed on Aug. 17, 2016.

(30) Foreign Application Priority Data

Sep. 2, 2015  (CN) .......................... 2015 1 0557695
Sep. 2, 2015  (CN) .......................... 2015 1 0557759

(51) Int. Cl.
*H02K 11/21*   (2016.01)
*H02P 6/16*   (2016.01)
(Continued)

(52) U.S. Cl.
CPC ............... *H02K 11/21* (2016.01); *B25F 5/00* (2013.01); *H02K 3/28* (2013.01); *H02P 6/16* (2013.01); *H02P 6/30* (2016.02); *H02K 7/145* (2013.01)

(58) Field of Classification Search
CPC ..... H02P 6/14; H02P 6/16; H02P 6/30; H02K 11/33; H02K 11/215; H02K 3/28; H02K 11/21

See application file for complete search history.

(56) References Cited

U.S. PATENT DOCUMENTS 8,067,913 B2 * 11/2011 Watabe ............... B25F 5/00
                                                       318/244
9,950,417 B2 *  4/2018 Ito ....................... B25F 5/00
(Continued)

FOREIGN PATENT DOCUMENTS

CN           1728534 A      2/2006
CN         101273519 A      9/2008
(Continued)

OTHER PUBLICATIONS

ISA/CN, Int. Search Report issued on PCT application No. CN2016/095631, dated Nov. 25, 2016, 2 pages.

*Primary Examiner* — Thai T Dinh
(74) *Attorney, Agent, or Firm* — Greenberg Traurig, LLP

(57) ABSTRACT

An electric power tool and a method for driving a brushless motor in the electric power tool. The electric power tool includes a driving circuit for driving the brushless motor and position sensors (D1, D2, D3) for detecting positions of the rotor. The rotor of the brushless motor, when rotating in a normal direction, sequentially passes by a commutation position, where a signal of at least one of the position sensors (D1, D2, D3) in the brushless motor changes, and a reference position, where a back electromotive force of the stator winding of at least one phase in the brushless motor is at a midpoint position of the waveform of the back electromotive force. An electrical angle between the commutation position and the reference position ranges from 20° to 40°. The (Continued)

position sensors (D1, D2, D3) are configured such that performance of the brushless motor is improved.

17 Claims, 16 Drawing Sheets

(51) Int. Cl.
*H02P 6/30* (2016.01)
*B25F 5/00* (2006.01)
*H02K 3/28* (2006.01)
*H02K 7/14* (2006.01)

(56) References Cited

U.S. PATENT DOCUMENTS

| | | | | |
|---|---|---|---|---|
| 2014/0103840 A1* | 4/2014 | Lim | ........................... | H02P 6/14 |
| | | | | 318/139 |
| 2014/0232316 A1* | 8/2014 | Philipp | ................ | A61B 17/151 |
| | | | | 318/504 |
| 2015/0022125 A1* | 1/2015 | Takano | ................... | H02P 27/08 |
| | | | | 318/139 |

FOREIGN PATENT DOCUMENTS

| | | |
|---|---|---|
| CN | 101938238 A | 1/2011 |
| CN | 103299535 A | 9/2013 |
| CN | 104579045 A | 4/2015 |

\* cited by examiner

ELECTRIC POWER TOOL AND METHOD FOR DRIVING BRUSHLESS MOTOR THEREOF

TECHNICAL FIELD

The present disclosure relates to the field of electric power tools and, in particular, relates to an electric power tool and a method for driving a brushless motor in the electric power tool.

BACKGROUND

A brushless motor is generally composed of a motor and a corresponding driving circuit. As compared to a brush motor, the brushless motor has a lower running noise and a longer service life. Generally, brushless motors are classified into sensor controlled brushless motors and sensor-less brushless motors, depending on whether they are provided with sensors for detecting positions of a rotor.

For controlling with sensors, the positions of position sensors and the control method of the position sensors are important factors affecting performance of the brushless motor.

SUMMARY

An electric power tool includes a brushless motor, which includes a rotor and a stator winding including at least two phases, and a driving system. The driving system comprises a driving circuit for driving the brushless motor, position sensors for detecting positions of the rotor, and a controller configured for controlling the driving circuit according to signals corresponding to the positions detected by the position sensors such that the rotor of the brushless motor, when rotating in the normal direction, sequentially passes by commutation positions, where the signal of at least one of the position sensors in the brushless motor changes, and a reference position, where a back electromotive force of the stator winding of at least one phase in the brushless motor is at a midpoint position of a waveform of the back electromotive force. A difference between an electrical angle of one of the commutation positions and an electrical angle of the reference position ranges from 20° to 40°.

Furthermore, a difference between a physical angle of the reference position and a closest one of the commutation positions may range from 20°/P to 40°/P, where P is a number of pole pairs of the brushless motor.

Furthermore, the stator winding may include three phase whereby the difference between an electrical angle of one of the commutation positions and an electrical angle of the reference position is 20°.

Furthermore, the stator winding may include three phases and the three phases of the stator winding may be configured by a Y-connection.

Furthermore, the stator winding may include three phases and the three phases of the stator winding may be configured by a delta connection.

Furthermore, the position sensors may comprise a first position sensor and a second position sensor, when the driving circuit drives the rotor to rotate in the normal direction, the rotor sequentially passes by a first position and a second position, and, when the rotor rotates to the first position, a signal of the first position sensor changes and the driving circuit switches to a first forward driving state, and, when the rotor rotates to the second position, a signal of the second position sensor changes and the driving circuit switches to the second forward driving state. When the driving circuit drives the rotor to rotate in a reverse direction and the rotor rotates to the second position, the signal of the second position sensor changes and the driving circuit switches to a first backward driving state, and, when the driving circuit drives the rotor to rotate in the reverse direction and the rotor rotates to the first position, the signal of the first position sensor changes and the driving circuit switches to a second backward driving state. A voltage applied to the rotor by the driving circuit in the first backward driving state is opposite to a voltage applied to the rotor by the driving circuit in the first forward driving state.

A method for driving a brushless motor in an electric power tool, the electric power tool comprising position sensors and a driving circuit, is also described. The method includes detecting, by the position sensors, positions of a rotor of the brushless motor and changing, by the driving circuit, a state of a voltage applied to a stator winding according to signals corresponding to the positions of the position sensors. The state of the voltage applied to the stator winding by the driving circuit is defined as a driving state of the driving circuit. When the rotor of the brushless motor rotates in a normal direction, the driving circuit is sequentially in a first forward driving state, in a second forward driving state, and in a third forward driving state according to changes in the signals of the position sensors. When the rotor of the brushless motor rotates in a reverse direction, the driving circuit is sequentially in a first backward driving state, in a second backward driving state, and in a third backward driving state according to the changes in the signals of the position sensors. A voltage applied to the rotor by the driving circuit in the first backward driving state is opposite to a voltage applied to the rotor by the driving circuit in the second forward driving state; a voltage applied to the rotor by the driving circuit in the second backward driving state is opposite to a voltage applied to the rotor by the driving circuit in the first forward driving state; and a voltage applied to the rotor by the driving circuit in the third backward driving state is opposite to a voltage applied to the rotor by the driving circuit in the third forward driving state.

Furthermore, the driving circuit in the method may have six driving states in an electric cycle.

Furthermore, the stator winding in the method may include three phases and the three phases of the stator winding may be configured by a Y-connection.

Furthermore, the stator winding in the method may include three phases and the three phases of the stator winding may be configured by a delta connection.

Furthermore, when the rotor of the brushless motor rotates in the normal direction and the signals of the position sensors change again in the method, the driving circuit may switch from the second forward driving state to a third forward driving state, and the third forward driving state and the second backward driving state are the same.

Furthermore, when the rotor of the brushless motor rotates in the reverse direction and the signals of the position sensors change again in the method, the driving circuit may switch from the second backward driving state to a third backward driving state, and the third backward driving state and the first forward driving state are the same.

Furthermore, the number of the position sensors in the method may be three and any two of the three position sensors are separated by a physical angle of 120°.

Furthermore, positions of the position sensors in the method may be configured such that the a signal of each of the position sensors is advanced by an electrical angle of 20° to 40° from a reference position of the rotor.

Furthermore, positions of the position sensors in the method may be configured such that a signal of each of the position sensors change at a position advanced by an electrical angle of 20° to 40° from a neutral line of a phase voltage.

Furthermore, positions of the position sensors in the method may be configured such that a signal of each of the position sensors change at a position advanced by an electrical angle of 20° to 40° from a neutral line of a line voltage of the stator winding.

Furthermore, the stator winding in the method may include three phases where positions of the position sensors are configured such that a signal of each of the position sensors is advanced by an electrical angle of 20° from a reference position of the rotor.

The above solutions can improve performance of the brushless motor.

DETAILED DESCRIPTION

The subject system and method will be described below in detail in conjunction with the accompanying drawings and various examples.

Figure 1:
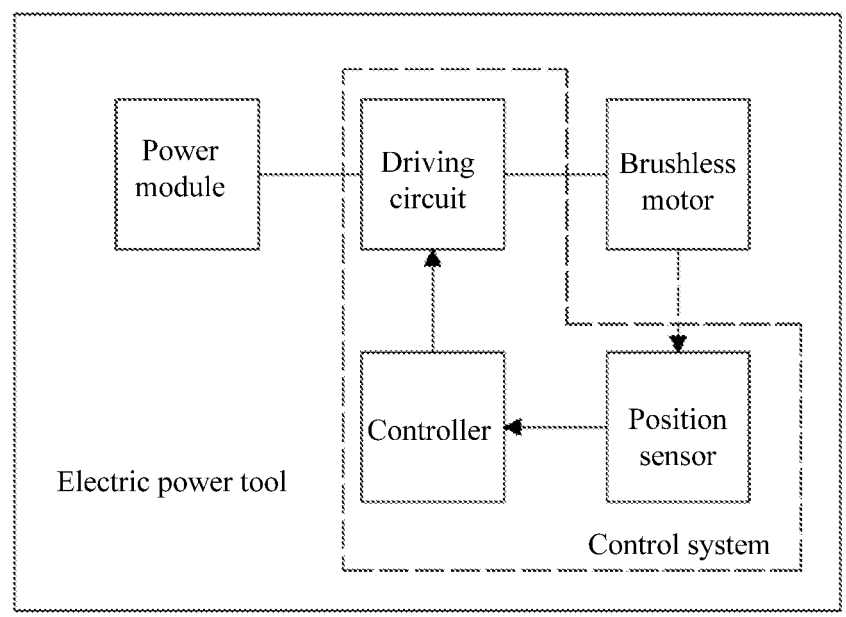
FIG. 1 is a schematic block diagram of an exemplary electric power tool.
Figure 14:
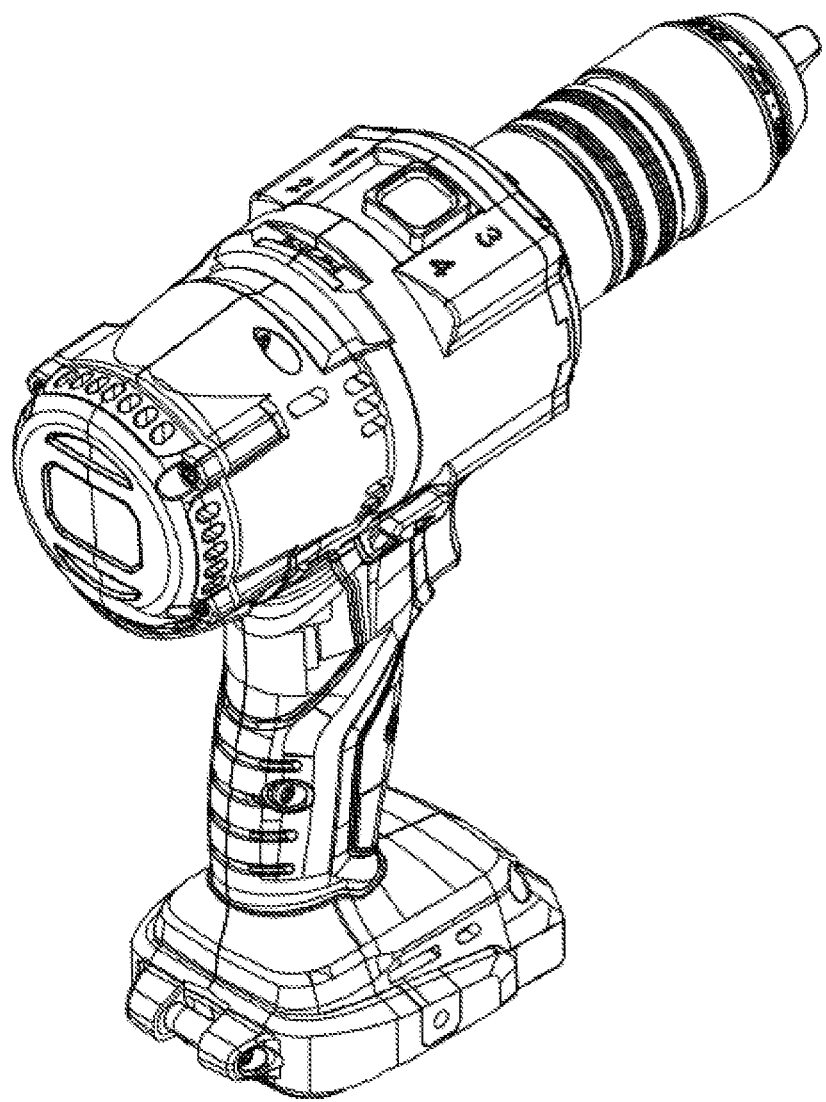
FIG. 14 illustrates an example power tool employing the advanced position sensors of FIG. 5.
Figure 15:
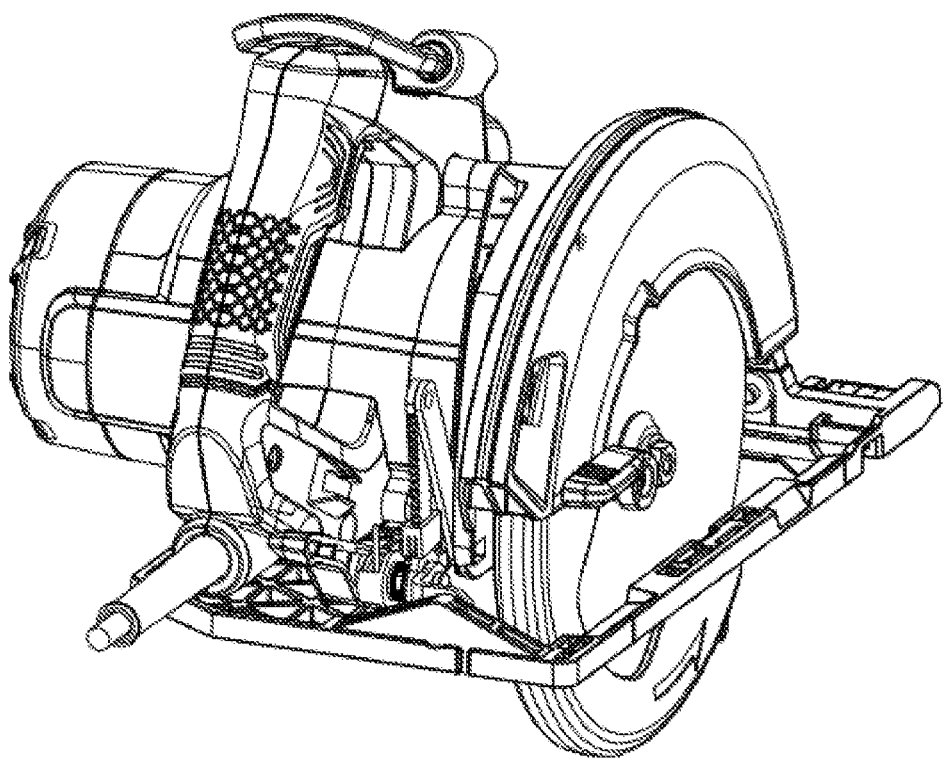
FIG. 15 illustrates a further example power tool employing the advanced position sensors of FIG. 5.
Figure 16:
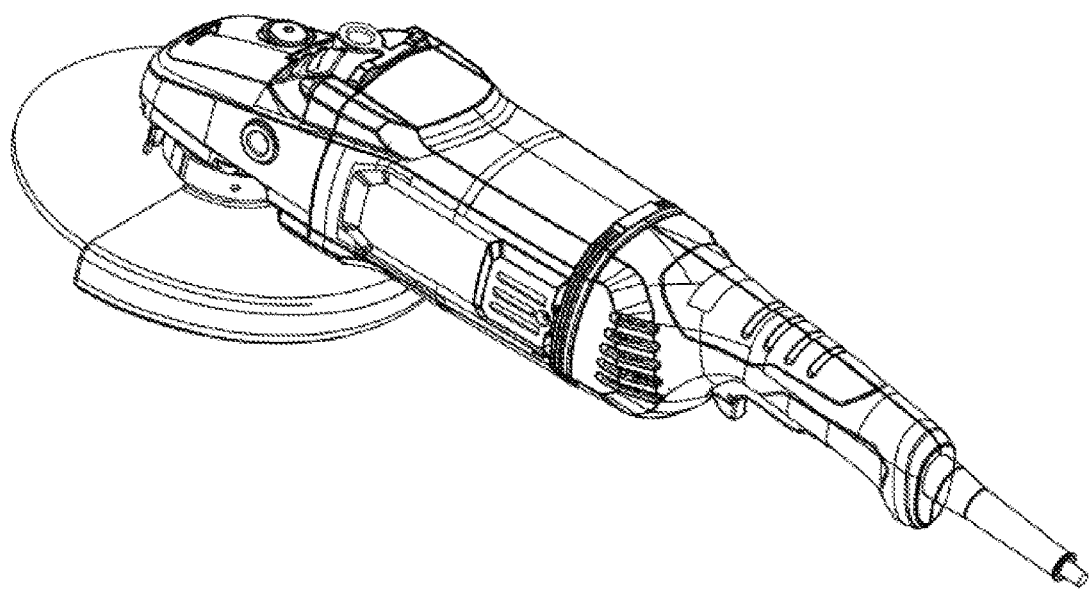
FIG. 16 is a still further example power tool employing the advanced sensors of FIG. 5.

As illustrated in FIG. 1, an electric power tool of an example includes a housing, a brushless motor within or supported by the housing, a driving system and a power module. The power tool may be any suitable type of hand-held or portable power tool or machine such as a drill in FIG. 14, a saw in FIG. 15, a grinder in FIG. 16, etc. The power tool may likewise be garden tools including a blower, a mower, a ride vehicle, a mower robot, etc.

In one example, the brushless motor includes a rotor and a stator winding including at least two phases.

The driving system is configured to drive the brushless motor to rotate. Specifically, the driving system includes position sensors, a controller, and a driving circuit.

The position sensors are configured to detect positions of the rotor. More specifically, when the rotor rotates to a preset range that can be detected by the position sensors, the position sensor or the position sensors are set in a signal state, and when the rotor rotates out of the preset range, the position sensors switch to another signal state.

In general, in order to acquire the position of the rotor, the smaller the preset range of the position sensors and the larger the number of the position sensors, the more precise the acquired position of the rotor will be. However, in fact, when the brushless motor is driven, just a commutation position needs to be acquired, i.e., the position sensors are configured in such a way that the signals of the position sensors can reflect the commutation position.

Figure 5:
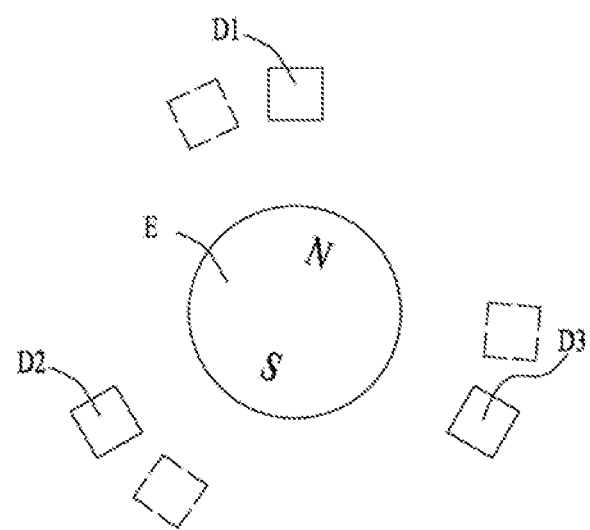
FIG. 5 is a schematic diagram of positions of position sensors in the electric power tool of FIG. 1.
Figure 6:
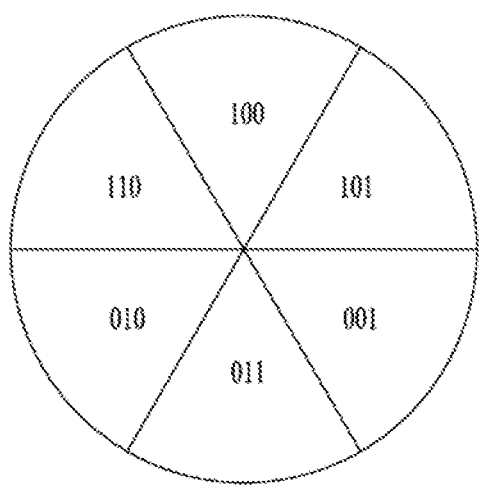
FIG. 6 is a schematic diagram of a correspondence between signals and signal regions of the position sensors of FIG. 5.

As an implementation solution, as illustrated in FIG. 5, three position sensors D1, D2 and D3 may be used. A range that the position sensors can detect is a range of a physical angle of 180°. When the rotor E rotates into or out of this range, signals of the position sensors change. When the rotor rotates into the preset range, the signals of the position sensors are defined as 1. When the rotor is outside the preset range, the signals of the position sensors are defined as 0. The three position sensors are separated from each other by a physical angle of 120°. As illustrated in FIG. 6, when the rotor rotates, six signal regions are generated. If the signals are sorted in the order of D1, D2 and D3, then six different signal combinations 100, 110, 010, 011, 001 and 101 are produced. Thus, it is possible to acquire which position range the rotor is in according to the combination of signals of the three position sensors D1, D2 and D3. It is to be noted that even if a number of pole pairs of the rotor increase, for one of the pole pairs, position detections are the same. A difference only lies in that an actual physical angle corresponding to one electric cycle is compressed.

As illustrated in FIG. 5, as long as a physical angle between adjacent position sensors is smaller than a physical angle detectable by the position sensors, different regions can correspond to different signal combinations by detecting position overlapping.

The brushless motor with a stator winding including the three phases has six driving cycles in one electric cycle (corresponding to one driving state of the driving circuit) corresponding to the signal combinations in the solution of FIG. 5. Therefore, when the signal combination of the position sensors changes, this brushless motor can perform one phase converting.

Specifically, the position sensors can be composed of Hall components.

The controller is configured to control the driving circuit according to the signals of the position sensors. The controller may receive the signals of the position sensors and then control the driving circuit according to the signals of the position sensors, so that the driving circuit switches the driving state.

The driving circuit is configured to drive the brushless motor. Specifically, the driving circuit includes multiple semiconductor switches. The connection state of the semiconductor switches may be changed according to a signal of the controller so as to change a state of a voltage that is applied by the power module to the winding of the brushless motor. To rotate the brushless motor, the driving circuit has multiple driving states. In each driving state, the stator winding of the brushless motor generates a magnetic field. The controller controls the driving circuit to switch the driving state to change the magnetic field generated by the stator winding to drive the rotor to rotate so as to drive the brushless motor.

Figure 2:
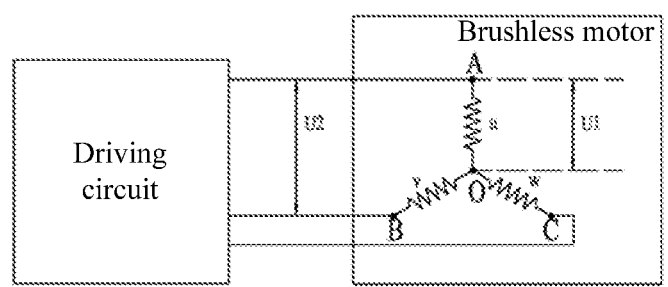
FIG. 2 is a schematic diagram of an exemplary brushless motor in the electric power tool of FIG. 1.

The brushless motor of FIG. 2 is used as an example. In this example, the brushless motor has the stator winding including the three phases u, v and w that are connected to form a Y shape. One end of u, one end of v and one end of w are connected to a neutral point O. Another end A of u, another end B of v and another end C of w serve as connecting ends of the winding for leading out and are connected to winding terminals (not shown) of the brushless motor. The driving circuit and other external circuits may be connected to the connecting ends A, B and C of the three phases u, v and w of the stator winding via the winding terminals. To drive the brushless motor of FIG. 2, the driving circuit has at least six driving states (depending on a number of phases of the stator winding). For ease of description, the driving state is represented by the corresponding connecting ends being connected thereto. For example, the driving circuit connects ends A and B to a power supply. If A is a high-voltage end or connected to a high-voltage end, then the driving state is represented by AB. If B is a high-voltage end or connected to a high-voltage end, then the driving state is indicated by BA. Such driving state representation method is also applicable to the triangle connection solution of FIG. 4. In addition, switching between the driving states may be simply referred to as the phase converting of the brushless motor.

In the solution of FIG. 2, when driving the rotor, the driving circuit can sequentially output six driving states AB, AC, BC, BA, CA and CB.

It is assumed that a correspondence between the driving states and the signal combinations of the position sensors are as listed in Table 1.

TABLE 1

| Signal Combination | Driving State |
| --- | --- |
| 101 | AB |
| 100 | AC |
| 110 | BC |
| 010 | BA |
| 011 | CA |
| 001 | CB |

According to this correspondence, the brushless motor can be driven through detecting the change of the signal combinations by the controller, i.e., controlling the driving circuit to switch the driving state.

In practice, the control is always a post-control, so when the rotor rotates to a position where the driving state needs to be switched, it is often too late to perform the control, affecting performance of the brushless motor.

To eliminate delay as much as possible and make the phase converting to correspond to the position of the rotor, the method of controlling of the phase converting may be performed with an advance on or ahead of the actual position of the rotor.

Problems with the advanced control if software is used for advanced control lie in that the software program is complicated and may not be reliable, the advance extent needs to be controlled, and the performance of the brushless motor is affected if the method of controlling of the phase converting is performed in a manner that is advanced too little or advanced too much.

As illustrated in FIG. 5, to achieve advanced control, the positions of sensors are configured such that physical positions of the position sensors are advanced from the conventional positions of the position sensors.

As illustrated in FIG. 5, dotted lines indicate positions (ideal or conventional positions) where the position sensors were arranged. These positions correspond to actual positions where phase converting is performed. In the solution of the present disclosure, the position sensors are disposed at positions advanced by an electrical angle of 20° to 40° from these positions or advanced by a physical angle of 20°/P to 40°/P from these positions. P denotes the number of pole pairs of the rotor of the brushless motor.

In practice, however, theses dotted lines do not exist when the position sensors are disposed. Therefore, the positions of the position sensors are determined using the solution described below.

First, a reference position is determined. The brushless motor is idly rotated by one round under action of an external force, and a phase voltage of each phase of the stator winding is detected so as to determine a phase voltage curve. Then, a position corresponding to a midpoint position of the phase voltage curve is used as the reference position (i.e., the example dotted box of FIG. 5). Then, a position sensor is arranged at a position advanced by the electrical angle of 20° to 40° with this position as a benchmark. This position is defined as a commutation position. Then, other position sensors are disposed according to an angle between each two position sensors.

At this time, the phase voltages are generated by a back electromotive force, so, at this time, the phase voltage curve is a curve of a back electromotive force and the reference position is a midpoint position of the back electromotive force waveform.

After such configuration, the rotor of the brushless motor, when rotating in the normal or forward direction, sequentially passes the communication positions and the reference position. When the rotor of the brushless motor passes the commutation position, a signal of at least one of the position sensors in the brushless motor changes to trigger the phase converting so as to enable the rotor to convert phase timely.

It is to be noted that this midpoint position refers to a position corresponding to a midpoint of the back electromotive force waveform. Since this waveform is periodically changed, one can make a single cycle (positive or negative) waveform with a position corresponding to the midpoint in time. If changes in the waveform are considered under ideal conditions, the single cycle waveform is symmetrical with respect to a straight line passing through the midpoint. This straight line is defined as a midline.

This range of the electrical angle should be the range of values between the reference position and the closest advanced communication position rather than all communication positions. The same is true to the physical angle range.

Figure 7:
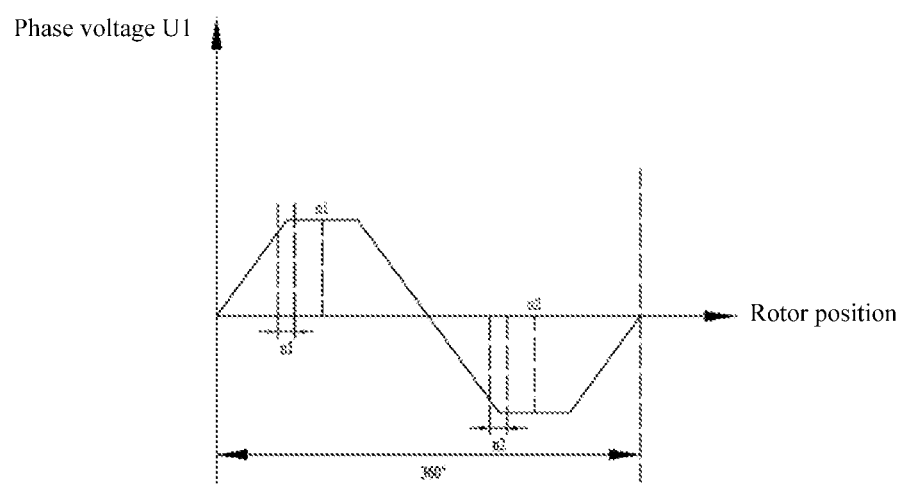
FIG. 7 is a schematic diagram of a phase voltage waveform in the solution of FIG. 2.

As illustrated in FIG. 7, a phase voltage U1 of the phase u of the stator winding of FIG. 2 is used as an example. In this example, it is assumed that the phase voltage U1 is 0 at the beginning of the rotation of the rotor. As illustrated in FIG. 7, when the rotor rotates by one round, the phase voltage U1 is divided into a positive part and a negative part. Each of the positive part and the negative part occupies 180°. The position m1 of 90° is one of the midpoint positions of the waveform. A position sensor may be disposed at a position advanced by the electrical angle of about 20° to about 40° from a position corresponding to the midpoint position, i.e., a region represented by n1 of FIG. 7. Then m2 as another midpoint position of the waveform is determined by the negative part of the waveform. Similarly, a region represented by n2 can be determined according to this point.

Since the solution of FIG. 2 has the stator winding including the three phases, actual positions corresponding to six midpoint positions can be determined from the three phases, so that six commutation positions where the signal combinations of the position sensors change are determined.

Figure 8:
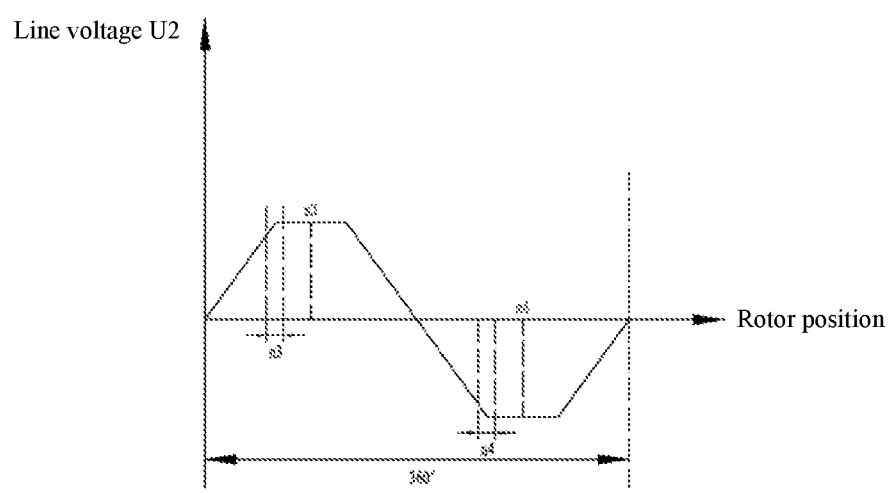
FIG. 8 is a schematic diagram of a line voltage waveform in the solution of FIG. 2.

Similar to FIG. 7, a line voltage U2 curve of FIG. 8 may also be used to determine an advanced position. In FIG. 8, m3 and m4 are two midpoint positions of the waveform and n3 and n4 are positions where the position sensors are arranged. The advantage of determining a position by use of the line voltage is that no peripheral circuit is required.

Figure 3:
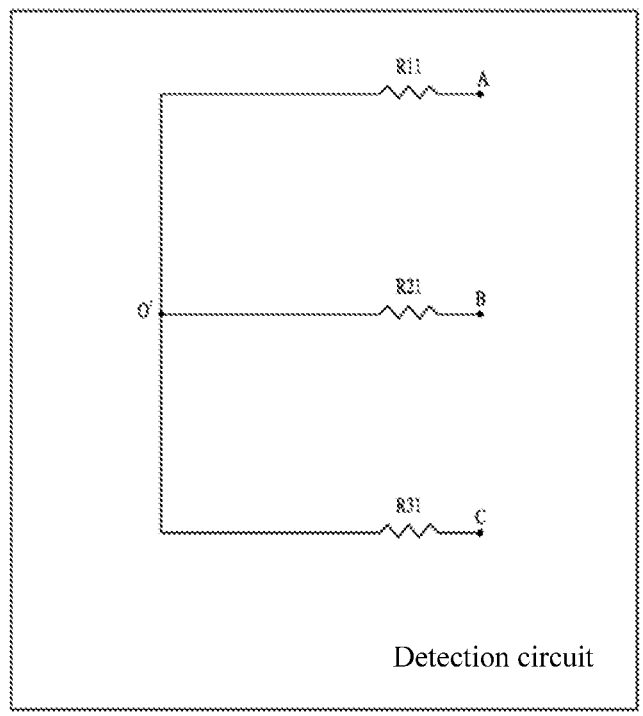
FIG. 3 is a schematic diagram of a peripheral circuit of the brushless motor of FIG. 2.

As illustrated in FIG. 3, since the stator winding including the phases u, v and w are inside the brushless motor, if phase voltages need to be detected, an additional detection circuit is required. Specifically, as illustrated in FIG. 3, voltages of the stator winding with the phases u, v and w in the motor can be detected or simulated when a circuit is formed by resistors R1, R2 and R3, one terminal of the resistor R1, one terminal of the resistor R2 and one terminal of the resistor R3 are connected to the connecting end A, the connecting end B and the connecting end C respectively and the other end of the resistor R1, the other terminal of the resistor R2 and the other terminal of the resistor R3 are connected to a simulative neutral point O'. For example, to calculate a phase voltage U1 of the phase u of the stator winding, voltages at two ends of AO' need to be detected. Therefore, the phase voltage curve can be determined by the detection circuit.

To save costs, a line voltage may also be used to determine the reference position. A voltage between any two connecting ends of the phases u, v and w of the stator winding is defined as the line voltage, because they may be obtained at the winding terminals of the brushless motor.

Similarly, a position corresponding to a midpoint position of a line voltage waveform curve is used as the reference position.

Figure 4:
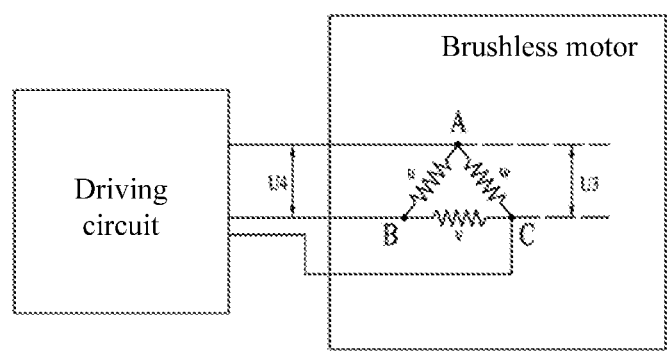
FIG. 4 is a schematic diagram of another exemplary brushless motor in the electric power tool of FIG. 1.

For the solution of FIG. 4, the brushless motor switches between six different driving states in one electrical cycle. This brushless motor just adopts a different wiring mode and also needs advanced control. The rotor to be detected for the advanced control is independent of the wiring mode of the winding. Thus, the above solution is also applicable to the solution of FIG. 4. The difference lies in that the phase voltage U3 and the line voltage U4 shown in FIG. 4 are the same.

Figure 9:
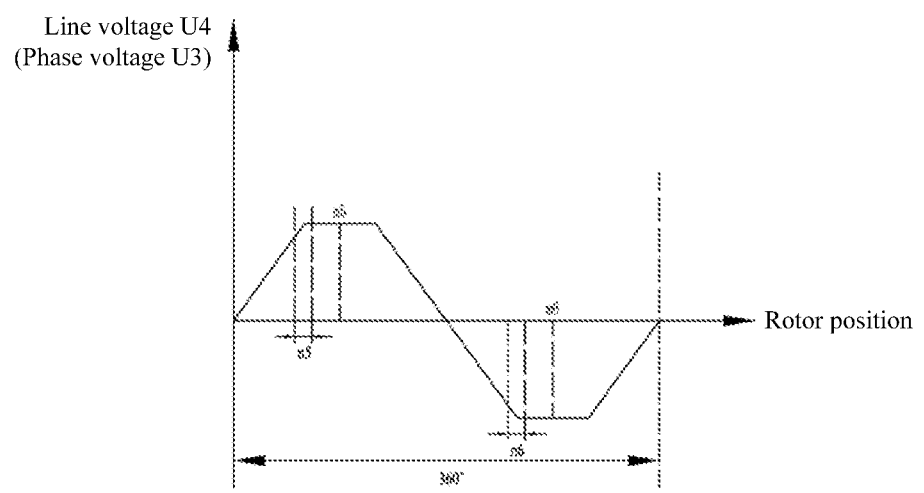
FIG. 9 is a schematic diagram of a line voltage waveform in the solution of FIG. 4.

In addition, a curve shown in FIG. 9 is a curve of the line voltage U4 of the solution of FIG. 4. For triangle connection, the line voltage U4 and the phase voltage U3 are the same, so winding connection modes are different. However, there is no difference for the rotor and the position sensors. Similarly, three phases need to switch among six driving modes. The above solution can also be used for the triangle connection to determine an advanced position. In FIG. 9, m5 and m6 are two midpoint positions of the waveform and n5 and n6 are positions where the position sensors are arranged.

Figure 10:
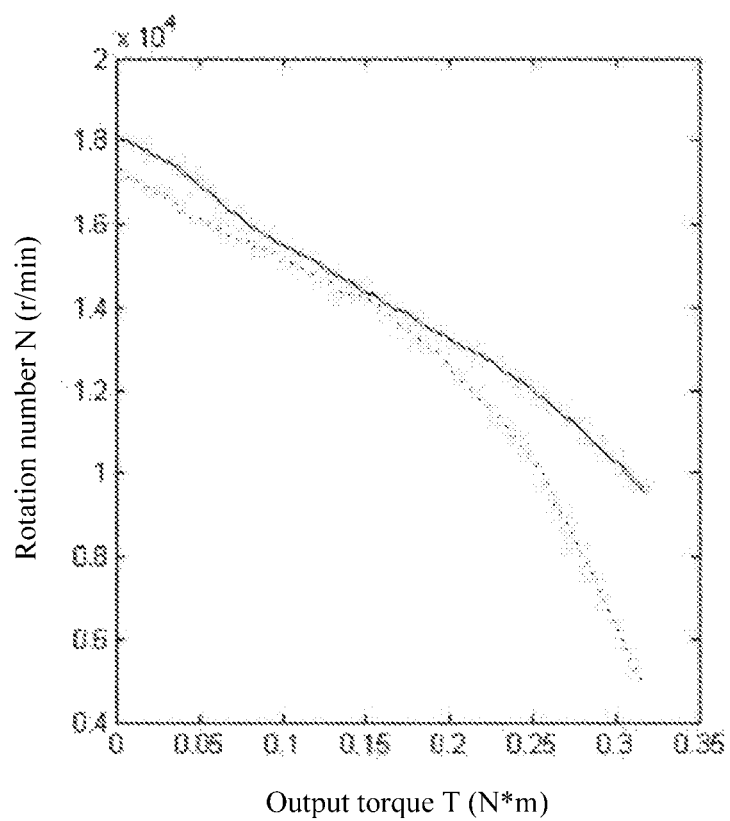
FIG. 10 is a curve graph showing a torque-rotation number relationship of a solution where position sensors are advanced by an electrical angle of 20° and a torque-rotation number relationship of a solution where the position sensors are disposed at a reference position as a comparison.
Figure 11:
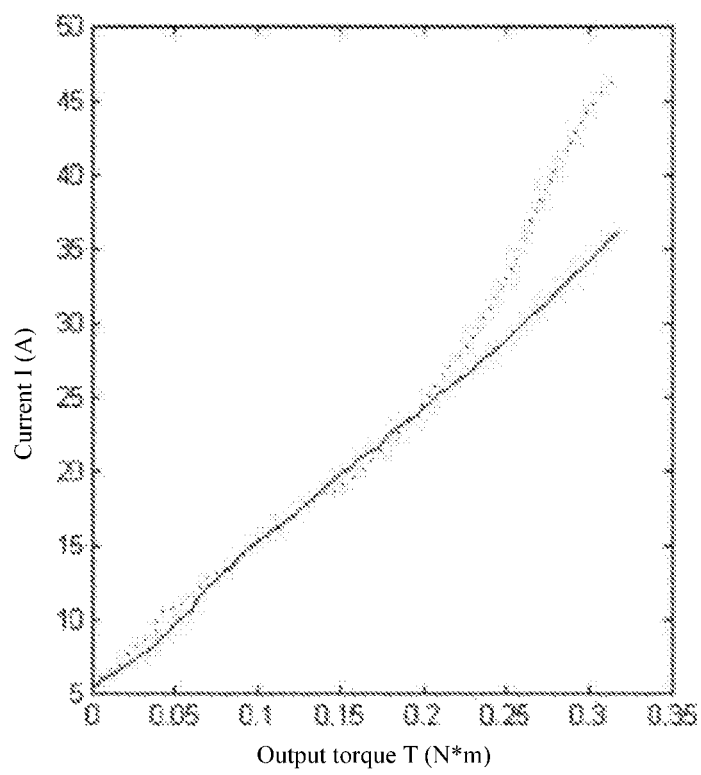
FIG. 11 is a curve graph showing a torque-current relationship of a solution where position sensors are advanced by an electrical angle of 20° and a torque-current relationship of a solution where the position sensors are disposed at a reference position as a comparison.

Referring to FIGS. 10 and 11, a torque-rotation number relationship of a solution in which the position sensors are advanced by an electrical angle of 20° and a torque-rotation number relation of a solution in which the position sensors are disposed at a reference position, and a torque-current relationship of a solution in which the position sensors are advanced by an electrical angle of 20° and a torque-current relation of a solution in which the position sensors are disposed at a reference position are detected. The detection results are as illustrated in FIGS. 10 and 11. That is to say, with regard to the stator winding including the three phases, the position sensors may be advanced by an electrical angle of 20°.

Figure 12:
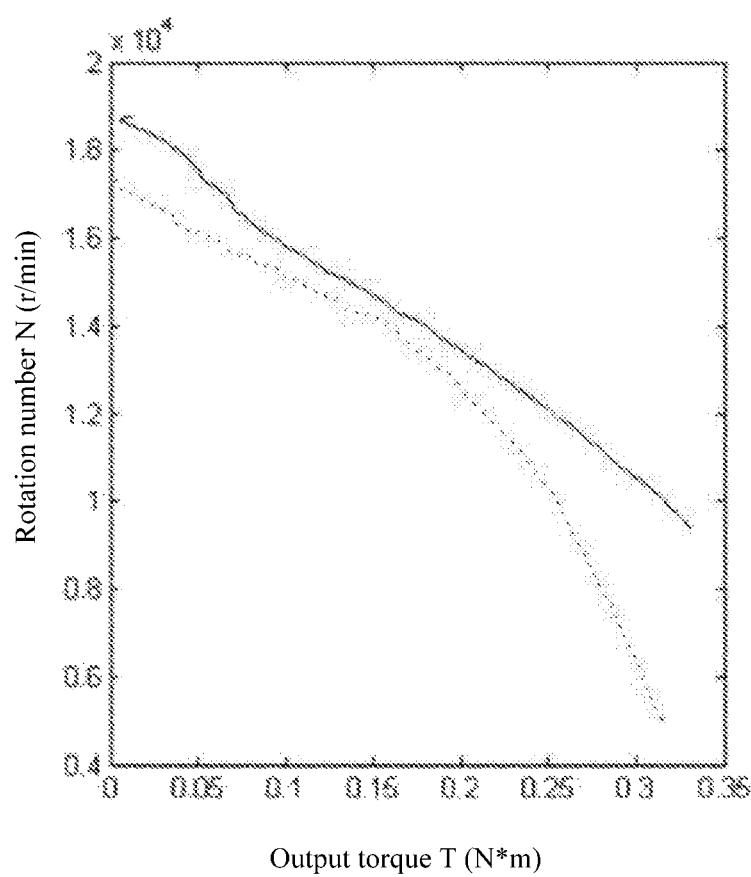
FIG. 12 is a curve graph showing a torque-rotation number relationship of a solution where position sensors are advanced by an electrical angle of 40° and a torque-rotation number relationship of a solution where the position sensors are disposed at a reference position as a comparison.
Figure 13:
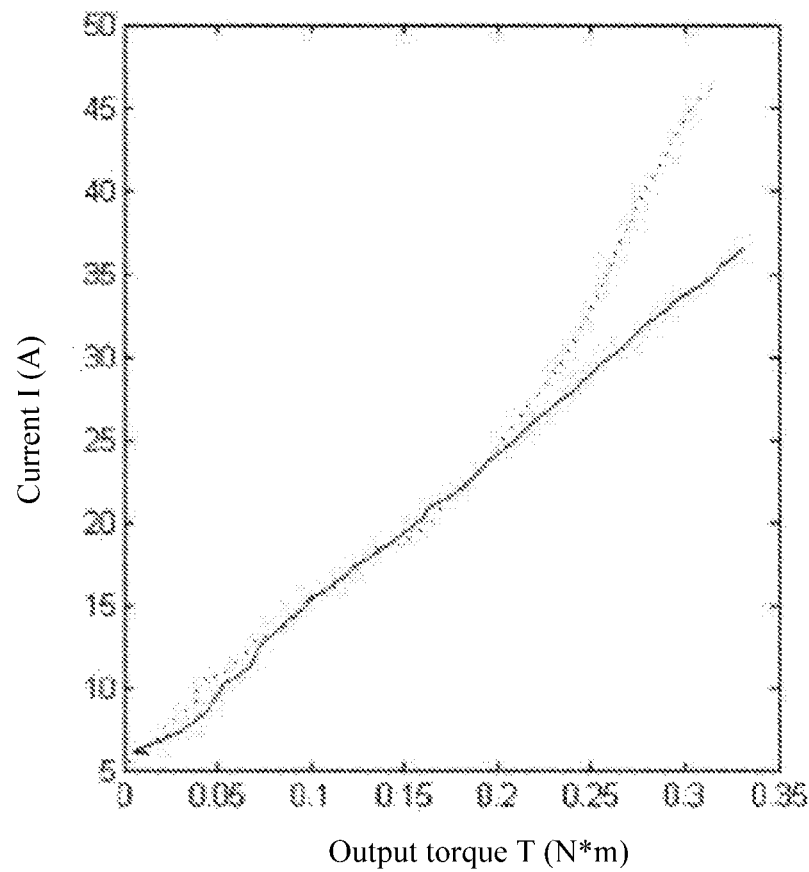
FIG. 13 is a curve graph showing a torque-current relationship of a solution where position sensors are advanced by an electrical angle of 40° and a torque-current relationship of a solution where the position sensors are disposed at a reference position as a comparison.

Referring to FIGS. 12 and 13, a torque-rotation number relationship of a solution in which the position sensors are advanced by an electrical angle of 40° and a torque-rotation number relation of a solution in which the position sensors are disposed at a reference position, and a torque-current relationship of a solution in which the position sensors are advanced by an electrical angle of 40° and a torque-current relation of a solution in which the position sensors are disposed at a reference position are detected. The detection results are illustrated in FIGS. 12 and 13.

As illustrated in FIG. 10, the solid line is the curve of the solution where position sensors are advanced by an electrical angle of 20° while the dotted line is the curve of the solution without advanced configuration. From the detection result, it can be seen that when the torque is low, the rotation number in the solution represented by the solid line is higher than that in the solution represented by the dotted line. For electric tools, such as electric screwdrivers, it is often desirable to save time by tightening quickly at a low torque. Other electric tools have similar needs. It can be seen that the rotation number in the solution represented by the solid line is higher. When the torque is high, i.e., when an electric power is with heavy load, the rotation number in the solution represented by the dotted line decreases dramatically while the solution represented by the solid line improves such condition.

As illustrated in FIG. 12, the solid line is the curve of the solution where position sensors are advanced by an electrical angle of 40° while the dotted line is the curve of the solution where no advanced position is configured. The situation of FIG. 12 is similar to that of FIG. 10. The solution where position sensors are advanced by an electrical angle of 40° can also improve the rotation number performance of the electric power tool.

As illustrated in FIG. 11, the solid line is the curve of the solution in which position sensors are advanced by the electrical angle of 20° while the dotted line is the curve of the solution without advanced configuration. From the detection result, it can be seen that when the electric power tool is with heavy load, the current in the solution represented by the dotted line increases rapidly while the current in the solution represented by the solid line changes gently. This shows that the solution where position sensors are advanced by the electrical angle of 20° brings about better effects in security and overheating prevention of the motor.

As illustrated in FIG. 13, the solid line is the curve of the solution in which position sensors are advanced by an electrical angle of 40° while the dotted line is the curve of the solution without advanced configuration. From the detection result, it can be seen that the solution in which position sensors are advanced by the electrical angle of 40° also has the effect of reducing the current when the electric tool is with heavy load.

It can be seen from the above that the motor performance can be effectively improved when the position is advanced by electrical angles of 20° to 40°. It should be noted the stator winding may include one or more phases, but not limited to the at least two phases in the above-described example. For the one phase, the electrical angles may advance more than that of the at least two phases and include the range from 20° to 90°.

In addition, it is found from detection that if the position is advanced by an electrical angle less than 20°, insufficient advancing occurs, and if the position is advanced by an electrical angle greater than 40°, it is difficult to start the motor. For better performance improvement, the advanced angle may be further reduced to 25° to 35°. It is found from detection that the motor runs well in this range.

In the above solution, when the rotor rotates in the normal direction, since physical positions of the position sensors are advanced configured, performance of the brushless motor is improved. However, when the rotor rotates in the reverse direction, the physical positions of the position sensors are behind actual positions. In addition, delay occurs due to control. When the motor rotates in the reverse direction, the performance decreases and the current of the winding increases, affecting the service life of the brushless motor.

As a solution, when the driving circuit drives the rotor to rotate in the normal direction, the rotor sequentially passes through a first position and a second position, and, when the rotor rotates to the first position, a signal of the first position sensor changes and the driving circuit switches to a first forward driving state, and, when the rotor rotates to the second position, a signal of the second position sensor changes and the driving circuit switches to the second forward driving state. When the rotor continues to rotate to the third position, a signal of the third position sensor changes and the driving circuit switches to the third forward driving state.

When the driving circuit drives the rotor to rotate in the reverse direction and the rotor rotates to the third position, the signal of the third position sensor changes and the driving circuit switches to a first backward driving state, and, when the rotor rotates to the second position, the signal of the second position sensor changes and the driving circuit switches to a second backward driving state. When the rotor continues to rotate to the first position, the signal of the first position sensor changes and the driving circuit switches to a third backward driving state.

A voltage applied to the rotor by the driving circuit in the first backward driving state is opposite to a voltage applied to the rotor by the driving circuit in the second forward driving state. A voltage applied to the rotor by the driving circuit in the second backward driving state is opposite to a voltage applied to the rotor by the driving circuit in the first forward driving state. And a voltage applied to the rotor by the driving circuit in the third backward driving state is opposite to a voltage applied to the rotor by the driving circuit in the third forward driving state.

Furthermore, when the rotor rotates in the normal direction and the signals of the position sensors change again, the driving circuit switches from the second forward driving state to a third forward driving state, where the third forward driving state and the third backward driving state are a same driving state.

When the rotor rotates in the reverse direction and the signals of the position sensors change again, the driving circuit switches from the second backward driving state to a third backward driving state, where the third backward driving state and the third forward driving state are a same driving state.

Specifically, as illustrated in Table 2 which uses a brushless motor provided with three phase windings as an example.

TABLE 2

| Signal Combination | Forward Driving State | Normal Backward Driving State | Advanced Backward Driving State |
| --- | --- | --- | --- |
| 101 | AB | BA | BC |
| 100 | AC | CA | BA |
| 110 | BC | CB | CA |
| 010 | BA | AB | CB |
| 011 | CA | AC | AB |
| 001 | CB | BC | AC |

Assuming the first forward driving state AB and the second forward driving state AC, according to the traditional or normal control of Table 2, when the rotor rotates in the reverse direction, CA and BA are sequentially outputted (when the rotor rotates in the reverse direction, the sequence of signals is 100 and 101). Due to the reason just mentioned, such traditional control of backward rotation will lag behind to a greater extent, thus affecting performance of brushless motor.

To overcome this drawback, as a solution, the driving state when the rotor rotates in the reverse direction is opposite (opposite in a voltage application direction) to a previous state relative to a driving state when the rotor rotates in the forward or clockwise direction, and the driving state when the rotor rotates in the reverse direction and the driving state when the rotor rotates forward have a same signal combination.

In combination with Table 2, in this solution, when the rotor rotates in the reverse direction, if the signal combination is 100, the reverse driving state BA, not the reverse state CA opposite to the forward-rotating driving state AC that corresponds to the signal combination 100, is outputted, and the reverse driving state BA is opposite to the forward-rotating driving state AB that is the previous one relative to the forward-rotating driving state AC. In this way, when the rotor rotates, control lag is also compensated by setting position sensor advanced by a certain angle and thus performance and security can be ensured when the rotor rotates in the reverse direction. The power tool such as a drill, a saw, a grinder, etc. is provided to employ the advanced position sensor or sensors of FIG. 5. It should be noted that the advanced position sensor or sensors can be set in a manner such as in FIG. 5, but not limited to that in FIG. 5.

The above illustrates and describes basic principles, main features and advantages of the present disclosure. It is to be understood by those skilled in the art that the above embodiments do not limit the present disclosure in any form, and all solutions obtained by means of equivalent substitution or equivalent transformation fall within the protection scope of the present disclosure.

What is claimed is:
1. An electric power tool comprising:
   a housing;
   a brushless motor supported by the housing, the motor comprising a rotor and a stator winding including at least two phases; and a driving system, comprising:
a driving circuit for driving the brushless motor;
position sensors for detecting positions of the rotor; and
a controller configured for controlling the driving circuit according to signals corresponding to the positions of the position sensors such that the rotor of the brushless motor, when rotating in a normal direction, sequentially passes by commutation positions, where the signal of at least one of the position sensors in the brushless motor changes, and a reference position, where a back electromotive force of at least one of the at least two phases of the stator winding in the brushless motor is at a midpoint position of a waveform of the back electromotive force;
wherein a difference between an electrical angle of one of the commutation positions and an electrical angle of the reference position ranges from 20° to 40°.

2. The electric power tool of claim 1, wherein a difference between a physical angle of the reference position and a closest one of the commutation positions ranges from 20°/P to 40°/P, wherein P is a number of pole pairs of the brushless motor.

3. The electric power tool of claim 1, wherein the stator winding includes three phases and the difference between an electrical angle of one of the commutation positions and an electrical angle of the reference position is 20°.

4. The electric power tool of claim 1, wherein the stator winding includes three phases and the three phases of the stator winding is configured by a Y-connection.

5. The electric power tool of claim 1, wherein the stator winding includes three phases and the three phases of the stator winding is configured by a delta connection.

6. The electric power tool of claim 1, wherein the position sensors comprise a first position sensor and a second position sensor; when the driving circuit drives the rotor to rotate in the normal direction, the rotor sequentially passes by a first position and a second position, and, when the rotor rotates to the first position, a signal of the first position sensor changes and the driving circuit switches to a first forward driving state, and, when the rotor rotates to the second position, a signal of the second position sensor changes and the driving circuit switches to the second forward driving state, when the driving circuit drives the rotor to rotate in a reverse direction and the rotor rotates to the second position, the signal of the second position sensor changes and the driving circuit switches to a first backward driving state, and, when the driving circuit drives the rotor to rotate in the reverse direction and the rotor rotates to the first position, the signal of the first position sensor changes and the driving circuit switches to a second backward driving state, and a voltage applied to the rotor by the driving circuit in the first backward driving state is opposite to a voltage applied to the rotor by the driving circuit in the first forward driving state.

7. The method for driving a brushless motor of any one of claim 6, wherein positions of the position sensors are configured such that a signal of each of the position sensors change at a position advanced by an electrical angle of 20° to 40° from a neutral line of a phase voltage.

8. The method for driving a brushless motor of any one of claim 6, wherein positions of the position sensors are configured such that a signal of each of the position sensors change at a position advanced by an electrical angle of 20° to 40° from a neutral line of a line voltage of the stator winding.

9. The method for driving a brushless motor of any one of claim 6, wherein the stator winding includes three phases and positions of the position sensors are configured such that a signal of each of the position sensors is advanced by an electrical angle of 20° from a reference position of the rotor.

10. A method for driving a brushless motor in an electric power tool, the electric power tool comprising position sensors and a driving circuit, the method comprising:
detecting, by the position sensors, positions of a rotor of the brushless motor; and
changing, by the driving circuit, a state of a voltage applied to a stator winding according to signals corresponding to the positions of the position sensors;
wherein the state of the voltage applied to the stator winding by the driving circuit is defined as a driving state of the driving circuit, when the rotor of the brushless motor rotates in a normal direction, the driving circuit is sequentially in a first forward driving state, in a second forward driving state and in a third forward driving state according to changes in the signals of the position sensors, when the rotor of the brushless motor rotates in a reverse direction, the driving circuit is sequentially in a first backward driving state, in a second backward driving state and in a third backward driving state according to the changes in the signals of the position sensors, a voltage applied to the rotor by the driving circuit in the first backward driving state is opposite to a voltage applied to the rotor by the driving circuit in the second forward driving state, a voltage applied to the rotor by the driving circuit in the second backward driving state is opposite to a voltage applied to the rotor by the driving circuit in the first forward driving state, and a voltage applied to the rotor by the driving circuit in the third backward driving state is opposite to a voltage applied to the rotor by the driving circuit in the third forward driving state.

11. The method for driving a brushless motor of claim 10, wherein the driving circuit has six driving states in an electric cycle.

12. The method for driving a brushless motor of claim 10, wherein the stator winding includes three phases and the three phases of the stator winding are configured by a Y-connection.

13. The method for driving a brushless motor of claim 10, wherein the stator winding includes three phases and the three phases of the stator winding are configured by a delta connection.

14. The method for driving a brushless motor of claim 10, wherein, when the rotor of the brushless motor rotates in the normal direction and the signals of the position sensors change again, the driving circuit switches from the second forward driving state to a third forward driving state, and the third forward driving state and the second backward driving state are same.

15. The method for driving a brushless motor of claim 10, wherein, when the rotor of the brushless motor rotates in the reverse direction and the signals of the position sensors change again, the driving circuit switches from the second backward driving state to a third backward driving state, and the third backward driving state and the first forward driving state are same.

16. The method for driving a brushless motor of any one of claim 10, wherein a number of the position sensors is three and any two of the three position sensors are separated by a physical angle of 120°.

17. The method for driving a brushless motor of any one of claim 10, wherein positions of the position sensors are configured such that a signal of each of the position sensors is advanced by an electrical angle of 20° to 40° from a reference position of the rotor.

* * * * *